(12) United States Patent
Wang et al.

(10) Patent No.: US 7,003,613 B1
(45) Date of Patent: Feb. 21, 2006

(54) SYSTEM FOR TRANSFERRING DATA USING A USB HOST SYSTEM WITH A DEDICATED PROCESSOR

(75) Inventors: Jing Wang, Riverside, CA (US); Ping Liang, Riverside, CA (US); Xiaogang Luo, Montevideo, MN (US)

(73) Assignee: Transdimension Inc., Irvine, CA (US)

( * ) Notice: Subject to any disclaimer, the term of this patent is extended or adjusted under 35 U.S.C. 154(b) by 0 days.

(21) Appl. No.: 09/490,263

(22) Filed: Jan. 24, 2000

Related U.S. Application Data

(60) Provisional application No. 60/117,313, filed on Jan. 26, 1999.

(51) Int. Cl.
  *G06F 13/14* (2006.01)
(52) U.S. Cl. ...................... 710/305; 710/313
(58) Field of Classification Search ................ 709/321; 710/8, 305, 220, 72, 100, 20, 25, 308, 38, 710/71, 313, 62; 713/2, 501; 370/402
See application file for complete search history.

(56) References Cited

U.S. PATENT DOCUMENTS

| | | | |
|---|---|---|---|
| 5,594,894 A | * | 1/1997 | Mitra .......................... 713/501 |
| 6,009,480 A | * | 12/1999 | Pleso |
| 6,067,628 A | * | 5/2000 | Krithivas et al. ........... 713/340 |
| 6,073,205 A | * | 6/2000 | Thomson ..................... 711/100 |
| 6,085,265 A | * | 7/2000 | Kou ............................. 710/63 |
| 6,151,653 A | * | 11/2000 | Lin et al. ..................... 710/305 |
| 6,249,825 B1 | * | 6/2001 | Sartore et al. ................. 710/8 |
| 6,256,687 B1 | * | 7/2001 | Ellis et al. ..................... 710/71 |
| 6,279,049 B1 | * | 8/2001 | Kang ........................... 710/15 |
| 6,343,260 B1 | * | 1/2002 | Chew ........................ 702/122 |
| 6,389,029 B1 | * | 5/2002 | McAlear ..................... 370/402 |
| 6,389,495 B1 | * | 5/2002 | Larky et al. ................... 710/8 |
| 6,393,493 B1 | * | 5/2002 | Madden et al. |
| 6,549,958 B1 | * | 4/2003 | Kuba ......................... 710/14 |
| 2002/0057682 A1 | * | 5/2002 | Hansen et al. ............. 370/386 |
| 2002/0116565 A1 | * | 8/2002 | Wang et al. ................ 710/313 |
| 2003/0177294 A1 | * | 9/2003 | Russell ....................... 710/62 |
| 2004/0073726 A1 | * | 4/2004 | Margalit et al. ............. 710/72 |

* cited by examiner

*Primary Examiner*—Rehana Perveen
*Assistant Examiner*—Kim T. Huynh

(57) ABSTRACT

This invention is a USB host comprising a first processor implementing a function of a USB system and presenting a high-level pipe view of USB to a second processor. In one embodiment of this invention, first processor and the second processor communicate through a data communication memory (DCM) which can be accessed by both the first processor and the second processor, using a plural of pre-defined transfer record formats. From the second processor's point of view, a USB transfer becomes reading from and writing to the DCM with predefined record formats which can be done by filling templates.

44 Claims, 9 Drawing Sheets

| Address | Description | Ref |
|---|---|---|
| 000H | Area used for CPR, DPR, and SCR. The Main Processor 310 has the flexibility in allocating buffer sizes and multiple Records to fit the need of different USB transfers.<br><br>Main Processor 310: Read/Write<br>USB Host System 200: Read/Write | 400 |
| Last Address-m | Reserved for EER<br><br>USB Host System 200: Write only<br>Main Processor 310: Read only | 410 |
| Last Address-3 | MTUH: Main Processor 310 to USB host system 200 Message High Byte. Main Processor 310: Write only. USB host system 200: Read only | 420 |
| Last Address-2 | UTMH: USB Host System 200 to Main Processor 300 Message High Byte. Main Processor 310: Read only. USB Host System 200: Write only | 430 |
| Last Address-1 | UTML: USB Host System 200 to Main Processor 310 Message Low Byte. Main Processor: Read only. USB Host System 200: Write only. Writing to UTML sends an interrupt to Main Processor 310 | 435 |
| Last Address | MTUL: Main Processor 310 to USB host system 200 Message Low Byte. Main Processor 310: Write only. USB Host System 200: Read only. Writing to MTUL sends an interrupt to USB Host System 200 | 425 |

| Field | Size | Description |
|---|---|---|
| bmControl | 1 | Used by the Main Processor 310 to identify types of I/O request packet (IRP), and to control USB host system 200 activities. For Control Pipe Record: Bit 7 is 0, Bit 6 is 1, Bits 5...0 are Reserved. |
| bStatus | 1 | Used by the USB host system 200 to report the status of the IRP to the Main Processor 310. |
| wXferCount | 2 | For transfer from host to device: Used by the USB host system 200 to report to the Main Processor 310 the number of bytes successfully sent to the device. It must be less than wLength.<br>For transfer from device to host: Used by the USB host system 200 to report to the Main Processor 310 the number of bytes of data received and put in the Data area. It must be less than wLength. |
| bDeviceAddress | 1 | USB Device address, bit 7 always zero |
| bEndpointNumber | 1 | Endpoint number, default is endpoint 0. Bits 7-5 always zero |
| bRequestType | 1 | Type of command for the USB device.<br>Bit 7: Data transfer direction<br>    0 = Host-to-device, 1 = Device-to-host<br>Bits 6...5: Type<br>    0 = Standard request (Defined in Chapter 9 of USB Specification)<br>    1 = Class request (Defined in USB Device Class Specification)<br>    2 = Vendor request (Also called Client Request, used by the Client Software to control a USB device. Defined by a developer writing the device driver)<br>    3 = Reserved<br>Bits 4...0: Recipient<br>    0 = A downstream Device, 1 = An Interface in a device<br>    2 = An Endpoint in a device, 3 = Other, 4...31 = Reserved<br>All the standard requests are handled by the USB host system 200. In normal operation, the user only needs to use the class and vendor requests. Thus, in normal operation, bits 6...5 of bRequestType should be 01 or 10. |
| bRequest | 1 | This field specifies the particular command for the USB device. Defined by USB specification if bits 6...5=00 in bmRequestType (Chapter 9 of USB Specification). Defined by USB device driver if bits 6...5=10 in bmRequestType |
| wValue | 2 | The contents of this field vary according to the request. It is used to pass a parameter to the device, specific to the request. Defined by USB device driver if it is a client request. |
| wIndex | 2 | The contents of this field vary according to the request. It is used to pass a parameter to the device, specific to the request. Defined by USB device driver if it is a client request. |
| wLength | 2 | For transfer from host to device: Number of bytes of data to transfer<br>For transfer from device to host: Size of data buffer in bytes<br>If this field is zero, there is no data phase for the control transfer. |
| Data | vary | For transfer from host to device: Actual data if data is to be sent to device via the control pipe. Number of bytes of data specified wLength.<br>For transfer from device to host: Buffer area |

| Field | Size | Description |
|---|---|---|
| bmControl | 1 | Used by the Main Processor 310 to identify types of IRP, and to control USB host system 200 activities. For Data Pipe Record:<br>Bit 7: 0<br>Bit 6: 0<br>Bits 5...0: Reserved. |
| bStatus | 1 | Used by the USB host system 200 to report the status of the IRP to the Main Processor 310. |
| wXferCount | 2 | For transfer from host to device: Used by the USB host system 200 to report to the Main Processor 310 the number of bytes successfully sent to the device. It must be less than wLength.<br>For transfer from device to host: Used by the USB host system 200 to report to the Main Processor 310 the number of bytes of data received and put in the Data area. It must be less than wLength. |
| bDeviceAddress | 1 | USB Device address, bit 7 always zero |
| bEndpointNumber | 1 | Endpoint number, default is endpoint 0. Bits 7-5 always zero |
| wLength | 2 | For transfer from host to device: Number of bytes of data to transfer<br>For transfer from device to host: Size of data buffer in bytes |
| Data | vary | For transfer from host to device: Actual data if data is to be sent to device via the control pipe. Number of bytes of data specified wLength.<br>For transfer from device to host: Buffer area |

| Command Name | Description |
|---|---|
| USB System Reset | Resets USB host system 200 and all downstream hubs and devices. All Records will be lost and all devices will be re-enumerated. |
| Global Suspend | Suspend all hubs and devices including the root hub. However, the USB host system 200 will not be suspended. The USB host system 200 does not support remote wakeup. After a System Suspend, the system can only be waken up by the Main Processor issuing a System Resume to the USB host system 200. |
| Global Resume | Resumes all hubs and devices in the system. |
| Device Reset | Sending a USB Reset signal to the designated device. |
| Device Suspend | Suspend a designated device. |
| Device Resume | Resume a designated device. |
| Pipe Reset | The pipe's IRPs are aborted. The host state is moved to Active. If the reflected endpoint state needs to be changed, that must be commanded explicitly by the USBD client. |
| Pipe Halt | The pipe's state is set to Halted. |
| Clear Pipe Halt | The pipe's state is cleared from Halted to Active. |
| Pipe Abort | All of the IRPs scheduled for a pipe are retired immediately and returned to the client with a status indicating they have been aborted. Neither the host state nor the reflected endpoint state of the pipe is affected. |

| Field | Size | Description |
|---|---|---|
| bmControl | 1 | Used by the Main Processor 310 to identify types of IRP, and to control USB host system 200 activities. For System Command Record:<br>Bit 7: 1<br>Bits 6...5: Reserved<br>Bits 4...3: Command Category<br>        00: Command applies to USB system<br>        01: Command applies to a Device<br>        10: Command applies to an Endpoint<br>        11: Reserved<br>Bit 2: Reserved<br>Bits 1...0: Command Name<br>        For USB system and Device (Bits 4...3=00 or 01)<br>            00: System or Device Reset<br>            01: System or Device Suspend<br>            10: System or Device Resume<br>            11: Reserved<br>        For Endpoint (Bits 4...3=10)<br>            00: Pipe Reset<br>            01: Pipe Halt<br>            10: Clear Pipe Halt<br>            11: Pipe Abort |
| bStatus | 1 | Used by the USB host system 200 to report the status of the SCR to the Main Processor. |
| bDeviceAddress | 1 | USB Device address, bit 7 always zero. Not used if Bits 4...3 of bmControl=00. |
| bEndpointNumber | 1 | Endpoint number. Bits 7-5 always zero.<br>Not used if Bits 4...3 of bmControl=00 or 01. |

| Field | Size | Description |
|---|---|---|
| bStatus | 1 | Used by the USB host system 200 to report the status of the device and systems errors to the Main Processor.<br>Bit 7=0: Device enumeration report.<br>Bit 7=1: System error report. The Record consists of only four bytes.<br>Bits 6...0: Pending, being tested. |
| bDeviceAddress | 1 | When bStatus_Bit_7=0, this field is the address assigned to the USB Device by the USB host system 200, bit 7 always zero.<br>When bStatus_Bit_7=1, this field is an auxiliary system error code. |
| idVendor | 2 | When bStatus_Bit_7=0, this field is the Vendor ID (assigned by the USB).<br>When bStatus_Bit_7=1, this field is reserved. |
| idProduct | 2 | Product ID. Not present when bStatus_Bit_7=1 |
| bcdDevice | 2 | Device release number in BCD. Not present when bStatus_Bit_7=1. |
| bConfiguration | 1 | The current configuration number of the device. Upon enumeration, the device is configured to its first configuration specified by the device descriptors. Not present when bStatus_Bit_7=1. |
| Reserved | 3 | Not present when bStatus_Bit_7=1. |

Figure 9

SYSTEM FOR TRANSFERRING DATA USING A USB HOST SYSTEM WITH A DEDICATED PROCESSOR

RELATED APPLICATIONS

This application claims the benefit under 35 U.S.C. 119(e) of U.S. Provisional Patent Application Entitled USB HOST MODULE filed on Jan. 26, 1999, Application Ser. No. 60/117,313.

FIELD OF THE INVENTION

The present invention relates to a Universal Serial Bus (USB) host system for embedded systems, and more specifically, to a system that has a standard microprocessor interface and contains the hardware and software or firmware that implements the USB host system including the USB Driver (USBD), Host Controller Driver (HCD), and Host Controller (HC).

BACKGROUND OF THE INVENTION

The USB is originally developed for personal computers (PCs). The USB also offers many advantages for many embedded applications. However, running the USBD and HCD on the same CPU or microprocessor or microcontroller in an embedded system that runs the application programs often complicates the hardware and software designs, and the operating system if there is one, of an embedded system. The CPU, or microprocessor or microcontroller in an embedded system that runs the application programs will be referred to the Main Processor or Application Processor hereafter. By the Main Processor or Application Processor it is understood that it is composed of the hardware of a CPU or microprocessor or microcontroller, its I/O interfaces, and the associated software or firmware including an operating system when appropriate. Sometimes, there is not enough system resource on the Main Processor to run the USB Driver and Host Controller Driver. This invention solves these problems with a dedicated processor in the host system, implementing the USBD and HCD, thus, simplifying the hardware and software architecture and the operating system of an embedded system.

A USB host is technically complex, requiring long learning curves. An apparatus that can implement the complex functions of a USB host and presents a simple, high level interface to the Application Processor of an embedded system is desired. The USB host system of this invention implements the USBD, HCD and HC inside the said system and presents a simple high level interface with a microprocessor, thus hiding the difficult details of the USB protocols, USB traffic scheduling, bandwidth management, error handling and recovery, and electrical signaling away from an embedded system developer and from the microprocessor and operating system of the embedded system. This will enable an embedded system developer to integrate an USB host into an embedded system without knowing the technical details of USB, and shorten the time-to-market of his products.

In prior art as shown in the two industry-standard USB host specifications, the "Universal Host Controller Interface (UHCI) Design Guide" Revision 1.1 published by the Intel Corporation, and the "OpenHCI: Open Host Controller Interface Specification for USB," (OHCI) Revision 1.0a, published by Compaq, Microsoft and National Semiconductor, to achieve high transfer rates on USB, the Host Controller requires a bus interface with bus master capability, such as a PCI bus, to interface with the CPU. In many embedded systems, there is no PCI bus. The interface between the USB host system of this invention and a microprocessor or a microcontroller is a non-PCI standard microprocessor bus interface.

The major differences between this invention and prior art USB hosts are given below:

1. In prior art USB host specifications and implementations, the USBD and HCD are run on the CPU of the PC, or the same processor as the application programs. In this invention, the USBD and HCD are run on a separate processor.

2. Prior art USB host specifications and implementations on PCs and platforms with PCI bus use the OHCI or the UHCI. The OHCI and UHCI are too complicated for embedded systems. This invention does not present an OHCI or UHCI to the Main Processor, rather it presents an interface to the application Client Software at the much higher level of USB pipes since this invention implements the complete USB host system including the USBD and HCD.

3. Prior USB host specifications and implementations depend on operating systems calls to access the USB host functions. This invention may provide the user full USB host functions using Application Programming Interfaces (APIs), thus, it can be used to provide USB host functions to an embedded system without an operating system, or with an operating system that does not support USB.

4. In an prior art USB host implementation that contains the USBD and HCD managed by an operating system supporting USB, the host system of this invention can still be used by intercepting the calls to the USBD and pass the calls to the USBD in the host system of this invention to process the calls.

5. Prior art USB host specification and implementations on PCs depend on bus mastering such as the PCI bus to interface the CPU or Application Processor with the USB Host Controller. This invention uses standard microprocessor bus between the USB host system and the Main Processor.

There are USB host related products for embedded systems. ScanLogic, Inc. of Bedford, Mass. makes a USB Host Controller SL11H. The SL11H is only a Host Controller, it only relates to a small part of in this invention. The SL11H does not have a programmable processor. The USBD and HCD still have to be run on the same processor as the application programs. VAutomation, Inc. of Nashua, NH offers a synthesizable HDL core of a USB Host Controller with the Host Controller function implemented using software on a RISC processor. This again only relates to a small part of in this invention. It has a programmable processor which only implements the HC. There are other similar products. None of these products offer a complete USB host system with the unique features of this invention, and none of them offer all types of USB command and pipe mechanisms. These products only implement a USB host controller, and USBD and HCD are to be implemented and run on the same processor as the application programs.

The solution to USB host for embedded systems such as those provided by ScanLogic Inc., Vautomation Inc. and similar products have serious disadvantages: Running the USBD and HCD on the Main Processor will take away significant time and memory resources from the application programs. There will be very frequent interrupts (one interrupt for each USB transaction) from the HC to the Main Processor. Since both the application programs and the USB host software all are implemented on the Main Processor, the software structure and management on the Main Processor becomes very complicated.

It is not obvious to use a processor separate from the Main Processor to implement the USBD and HCD because in the USB Specification, USBD and HCD are meant to be part of the drivers of an operating system, and USB Client Software access the USB system through calls to the operating system. In the prior art, USBD, HCD and USB Client Software are implemented on the same Main Processor. The fact that prior art USB Host Controllers that have been developed especially for embedded systems, such as those by ScanLogic Inc. and VAutomation Inc., leave the USBD and HCD to the Main Processor is a strong evidence that using a processor separate from the Main Processor to implement the USBD and HCD is not obvious.

In this invention, the USBD and HCD are implemented using a processor other than the Main Processor, the Main Processor access the USB system by writing to and reading from a buffer accessible by both the Main Processor and processor implementing the USB system and the Main Processor. The communication is in predetermined formats.

BRIEF SUMMARY OF THE INVENTION

The present invention has the following significant advantages over the prior art:

1. The present invention provides to an embedded systems developer a high-level pipe view of USB host with all four types of pipes, control, isochoronous, interrupt and bulk pipes. This shields the embedded system developers from all hardware, system driver and protocol details, including enumeration, attach/detach detection, scheduling, pipe management and error handling on the USB host side. Thus, it enables an embedded systems developer to design a product containing a full-function USB host and to write USB Client Software without knowing the details of the USB host specification and functions.

2. The present invention reduces complexity on the Main Processor by moving the USB host system to a separate processor. This makes it easier to design an embedded system and the software for the Main Processor in an embedded system that requires a USB host. The Main Processor's resources can then focus on the application programs. Since all low level USB activities are handled by the host system of the present invention, there will be significantly less interrupts to the Main Processor and significantly less demand on the Main Processor's resources, making the application programs run more efficiently on the Main Processor.

3. Prior USB host specifications and implementations depend on operating systems calls to access the USB host functions. This invention may provide the user full USB functions using Application Programming Interfaces (APIs), thus, it can be used to provide USB host functions to an embedded system without an operating system, or with an operating system that does not support USB. In an prior art USB host implementation that contains the USBD and HCD managed by an operating system supporting USB, the host system of this invention can still be used by intercepting the calls to the USBD and pass the calls to the USBD in the host system of this invention to process the calls.

4. This invention does not use bus mastering such as the PCI bus for interfacing with the Main Processor in an embedded system. Rather, it uses a standard microprocessor bus interface between the USB host of this invention with the Main Processor. This liberates the USB host system from the PCs and processors and platforms with PCI bus, and enables a full-function USB host to be used in any embedded system using any Application Processor. This invention contains a data communication memory (DCM) which can be accessed by both the processor in the USB host system of this invention and the Main Processor. In one embodiment of this invention, the DCM is a dual-port memory. The communication between the Main Processor and the USB host system of this invention is done using a plural of predefined record formats. From the Main Processor's point of view, USB transfers now become reading from and writing into the DCM with predefined record formats which can be done by filling templates. This greatly simplifies the task of integrating a USB host in an embedded system.

In one embodiment of this invention, there are two groups of software mechanisms to clients: command mechanisms and pipe mechanisms. Command mechanisms allow clients to configure and control USB devices through the device's default pipe. Pipe mechanisms allow USBD client to manage device specific data and control transfers. All four types of USB pipes, default control pipe, interrupt pipe, isochronous pipe and bulk pipe, are supported.

A USB pipe is an association between an endpoint on a device and software on the host. Pipes represent the ability to move data between software on the host via a memory buffer and an endpoint on a device. There are two different, mutually exclusive, pipe communication modes:

Stream: Data moving through a pipe has no USB defined structure.

Message: Data moving through a pipe has some USB defined structure.

Overall, this invention can provide USB host system to any processor, greatly reduces the manpower and resource requirements for integrating a USB host system into an embedded system and significantly shortens the time-to-market of embedded system products containing full-function USB host. It is an ideal solution to USB host for embedded systems, offering simplicity, easy of use, flexibility, and high performance.

BRIEF DESCRIPTION OF THE DRAWINGS

FIG. 4 shows the memory map of the DCM in a typical embodiment of this invention;

FIG. 5 shows the format of the Control Pipe Record (CPR) used by one embodiment of this invention for the command mechanism between the Main Processor in the embedded system and the USB host system of this invention;

FIG. 6 shows the format of the Data Pipe Record (DPR) used by one embodiment of this invention for the bulk and isochronous data transfer pipes and the interrupt pipe;

FIG. 7 shows the pre-defined USB commands implemented using the System Command Record (SCR) in one embodiment of this invention;

FIG. 8 shows the format of the System Command Record (SCR) used by one embodiment of this invention to implement USB system command and pipe command;

FIG. 9 shows the format of the Enumeration and Error Record (EER) used by one embodiment of this invention to notify enumeration and disconnect of USB devices and system errors to the Main Processor in the embedded system.

DETAILED DESCRIPTION OF THE INVENTION

Figure 1:
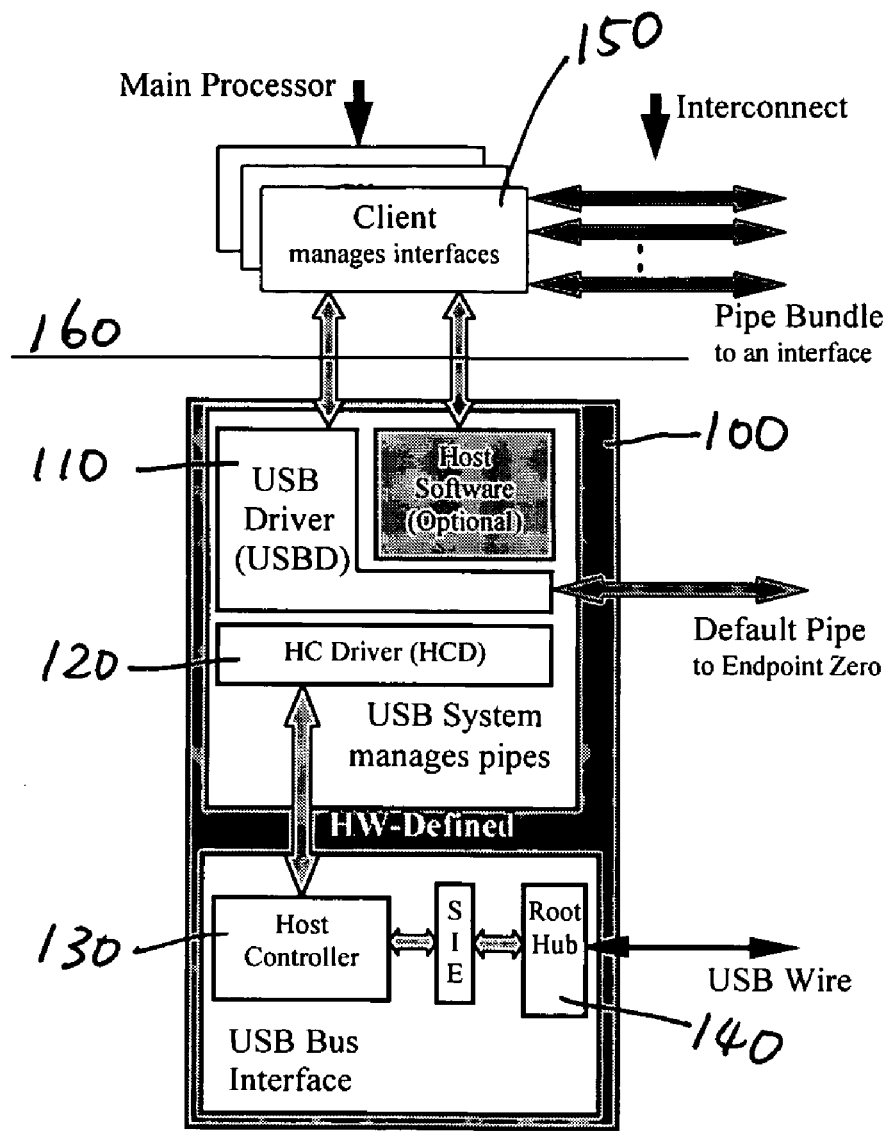
FIG. 1 shows the USB host structure and the different components in a USB host system.
Figure 2:
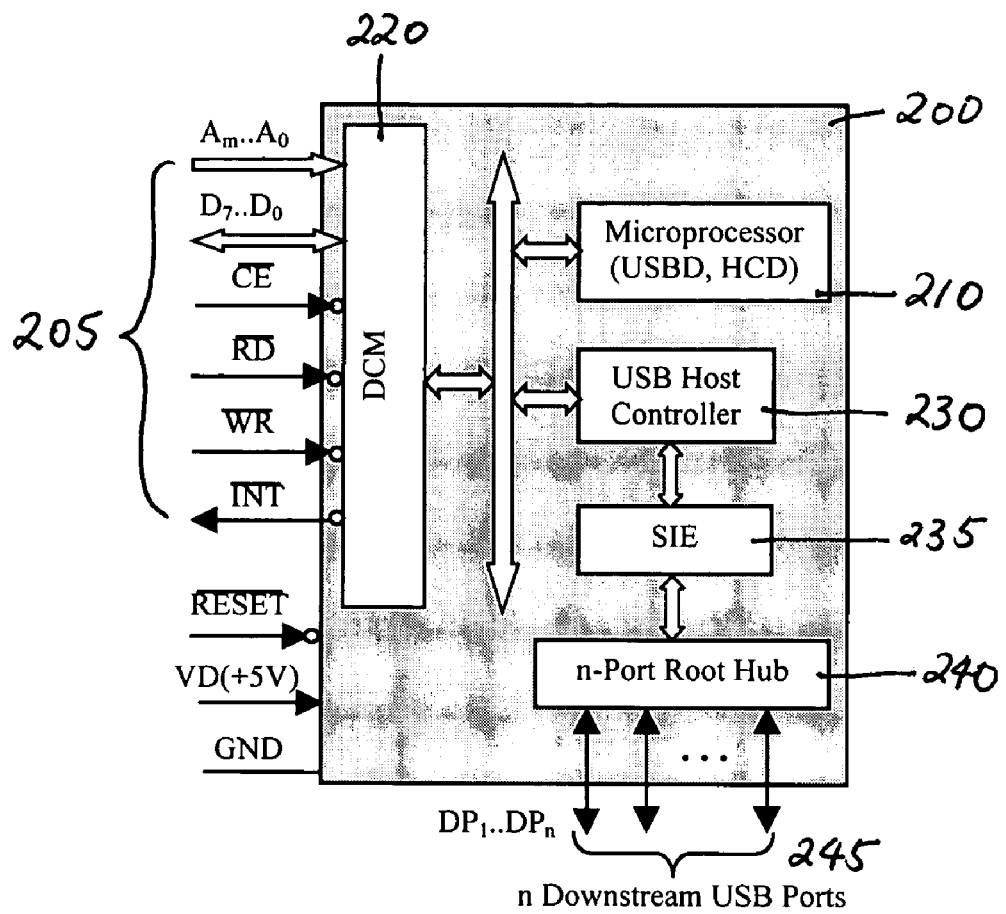
FIG. 2 shows the block diagram of one embodiment of this invention.
Figure 3:
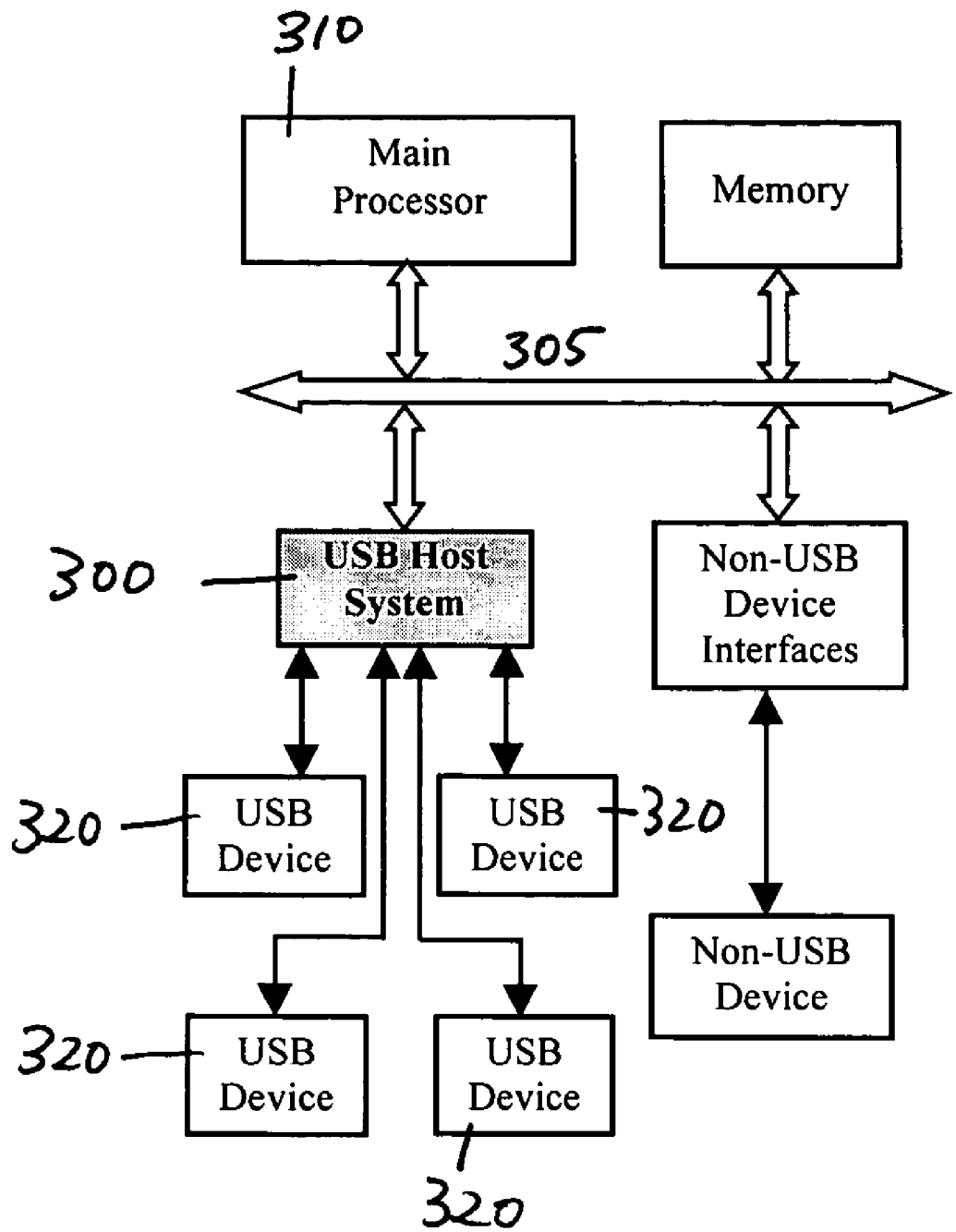
FIG. 3 shows a typical application of this invention in an embedded system.

Reference will now be made to the drawings wherein like numerals refer to like parts throughout. An embodiment of this invention is a system containing the hardware and firmware implementing all the functions enclosed in rectangle 100 in FIG. 1, including the USBD 110, HCD 120, HC 130 and root hub 140. The block diagram of a typical embodiment of this invention is shown in FIG. 2. USBD 110 and HCD 120 are run on the processor 210 in the USB host system. The USB host system 200 interfaces an Application Processor through a standard microprocessor bus interface 205. FIG. 3 shows a typical application of this invention. The partition of one embodiment of the memory space of the DCM is shown in FIG. 400.

The USB Diver Interface (USBDI) 160, i.e., the interface between the Main Processor/user Client Software and the USB host system of this invention, consists of exchanging predefined records via the DCM. In one embodiment of this invention, the predefined records include the following:

Control Pipe Record (CPR): Client Software initiated control transfer. The format of CPR in one embodiment of this invention is shown in FIG. 5.

Data Pipe Record (DPR): Client Software initiated isochronous, interrupt or bulk transfer. The format of DPR in one embodiment of this invention is shown in FIG. 6.

System Command Record (SCR): Main processor initiated, pre-defined USB system commands. The format of SCR in one embodiment of this invention is shown in FIG. 8.

Enumeration and Error Record (EER): USB host system initiated, device attach/detach, enumeration and system error report. The format of EER in one embodiment of this invention is shown in FIG. 9.

To initiate a USB transfer, a client 150 running on the Application Processor 310 writes a request, sometimes referred to as an I/O request packet IRP, as a Record in one of the predefined record format to the DCM 220 of the USB host system 200 through a standard microprocessor bus interface 305. The processor 210 in the USB host system 200 may be notified of the said request using an interrupt to the processor 210. The interrupt may be generated by writing to a special address 425 in the DCM 220. The address of the said request in the DCM 220 may be passed to the processor 210 using predefined addresses 420 and 425 in the DCM 220. The processor 210 then reads the address of the Record from the special address 420 and 425 from the DCM 220. It uses the address of the Record to read the actual Record in area 400 or 410. The processor 210 then interprets the Record, schedules USB transfers and completes the transfer at the appropriate time via the USB HC 230, the root hub 240 and a USB device 320 when necessary.

The processor 210 returns the status and data, if there is any, of the transfer to the same area of the Record allocated by the Application Processor 310. The Application Processor 310 may either poll the area of the Record, or be notified by an interrupt from the USB host system 200. The interrupt can be generated by the processor 210 writing to a special address 435 in the DCM 220. The address of the Record in the DCM 220 may be passed to the Application Processor 310 using predefined addresses 430 and 435 in the DCM 220. The Application Processor 310 reads the address of the Record from the predefined addresses 430 and 435, and finds out which Record the interrupt is about. It then reads the status and data, if there is any, and passes to the appropriate Client software 150. The Client software 150 decides the next step of operation.

The USB host system 200 has the function of hot plug and play, and automatically enumerates a USB device 320 when it is connected, and deletes it when it is disconnected. The USB host system 200 uses the EER to report to the Application Processor 310 the addition of a new USB device so that the Application Processor 310 can invoke the appropriate Client software 150 for the USB device 320. The USB host system 200 also uses the EER to report to the Application Processor 310 the deletion of a USB device from the bus so that the Application Processor 310 can disable the corresponding Client software 150 for the removed USB device 320.

The USBD 110 and HCD 120 in the USB host system 200 automatically manages the data bandwidth allocation, schedules USB transfers to ensure continuous data stream for isochronous devices and appropriate polling interval for USB interrupt pipes. It maintains the data structure containing the topology of all the devices on the bus, their configurations, interfaces and endpoints. It also maintains the data toggle, error retry and recovery and other USB host functions.

The formats of the four Records are presented in detail below.

Control Pipe Record (CPR)

The CPR implements the control pipe. It has the following format:

ControlPipe:[bmControl, bStatus, wXferCount, bDeviceAddress, bEndpointNumber, bmRequestType, bRequest, wValue, wIndex, wLength, Data]

The format of the CPR in the DCM 220 is as shown in FIG. 5 for one embodiment of this invention. A Client software 150 initiates a CPR 500. To initiate a control transfer, the Main Processor 310 allocates an area in the DCM 220 for a CPR 500 and writes a CPR 500 in the allocated area. With a single dispatch of a CPR 500 into the allocated area in the DCM 220, three separate stages of a control transfer (setup stage, optionally data stage, and the status stage), as defined in USB Specification, are automatically processed transparently to the user.

The USB host system 200 also uses the CPR 500 to notify the Main Processor 310 of the status of the transfer and any data returned by the device 320. An interrupt to the Main Processor 310 is generated upon completion, or an error condition of a Client Software 150 initiated USB control transfer. Upon receiving the interrupt, the Client Software 150 may read the associated CPR 500 from 430 and 435 in the DCM 220. The Client Software 150 uses the address in 430 and 435 to recognize to which CPR 500 the returned status and data apply. The transfer status, (no error, or an error condition) is given in the bStatus field of the Record. The wXferCount field will give the actual number of data transferred. Reading 435 clears the interrupt.

If the control transfer requested data from a device 320, the data returned from the device will be in the buffer area designated by the CPR 500. After the control transfer is completed, the Main Processor 310 may release a CPR 500 area in the DCM 220.

Data Pipe Record (DPR)

A Client Software 150 initiates a USB data transfer, (isochronous, interrupt and bulk) using a DPR with the following format.

DataPipe: [bmControl, bStatus, wXferCount, bDeviceAddress, bEndpointNumber, wLength, Data]

The format of the DPR 600 in the DCM 220 is as shown in FIG. 6 for one embodiment of this invention. The type of the data transfer (interrupt, bulk, and isochronous) and the direction of transfer are implicit and are determined by configuration and descriptor of the endpoint targeted by the transfer. Therefore, the DPR 600 does not specify the type and direction of the data pipe. This avoids inconsistency errors such as attempting to send isochronous data to an endpoint that is supposed to be Bulk IN.

To initiate a data transfer, a Client Software 150 first constructs the desired DPR 600 in DCM 220, and then writes the starting address of the DPR 600 to 420 and 425 in the DCM 220.

An interrupt to the Main Processor 310 is generated upon completion, or an error condition of a Client Software 150 initiated USB data transfer. Upon receiving the interrupt, the Client Software 150 may read the starting address of the associated DPR 600 from 430 and 435 in the DCM 220. This address is the same as the address the Client Software 150 allocated to the DPR 600. The Client Software 150 uses this address to recognize to which DPR 600 the returned status and data apply. The transfer status, (no error, or an error condition) is given in the bStatus field of the Record. The wXferCount field will give the actual number of data transferred. Reading 435 in DCM 220 clears the interrupt.

If the data transfer requested data from the device, the data returned from the device will be in the buffer area designated by the DPR 600. For bulk and isochronous transfers, once the transfer is completed, the Main Processor 310 may release the DPR 600 area in the DCM.

To establish a USB interrupt pipe, the Client Software must write and dispatch a DPR 600 to UH1000 targeted at the interrupt endpoint. This is equivalent to "enabling" the USB interrupt.

Upon an interrupt condition at a USB device 320, the USB host system 200 generates an interrupt to the Main Processor 310, prompting the user to examine the interrupt DPR 600 with address given in 430 and 435. This address is the same as the address the Client Software allocated to the interrupt DPR 600. Reading 435 clears the interrupt.

The DPR 600 needs to be issued only once to enable an interrupt pipe. The interrupt can be "disabled" by issuing an "Abort Pipe" command to the interrupt endpoint using a SCR. Once an interrupt DPR 600 is created in the DCM 220, it should remain there and the area should not be used by other Records unless the Client Software 150 wishes to disable the interrupt from the associated USB device 320.

An important advantage of using the USB host system 200 is to significantly reduce the number of interrupts to the Main Processor 310. It is important to realize that the data buffer size of a DPR 600 is not the same as the maximum packet size (or buffer) of the designated endpoint. For example, the maximum packet size of a bulk endpoint is 64 bytes, while a Client Software may dispatch a DPR 600 with a data buffer length of 1024 bytes (wLength=1024). The USB host system 200 will automatically break down the data into the appropriate packet size and transfer to the endpoint. It will only interrupt the Main Processor 310 once when all 1024 bytes are transferred. If the USB host software 110 and 120 are run on the Main Processor 310, the Main Processor 310 will be interrupted at least once for every 64 bytes of data.

A Client Software 150 may open multiple buffer areas for data transfer over the same pipe, i.e., set up multiple DPR 600 in the DCM 220 directed to the same endpoint of the same device. This may be critical in maintaining the data rate for isochronous transfers.

System Command Record (SCR)

The Application Processor 310 may issue pre-defined USB system commands using the SCR with the following format:

SysCmd:[bmControl, bStatus, bDeviceAddress, bEndpointNumber]

The pre-defined USB commands are shown in FIG. 7. The format of the SCR 800 in the DCM 220 is as shown in FIG. 8 for one embodiment of this invention. A SCR 800 is dispatched by first constructing the SCR 800 record in DCM 200, followed by writing its starting address into 420 and 425 in the DCM 220.

An interrupt to the Main Processor 310 is generated by the USB host system 200 upon completion (or an error condition) of a USB system command. Upon receiving the interrupt, the Main Processor 310 may read the starting address of the associated SCR 800 from the 430 and 435 in the DCM 220. This address is the same as the address the Client Software allocated to the SCR 800. The Application Processor 310 uses this address to recognize to which SCR 800 the returned status apply. The transfer status, (no error, or an error condition) is given in the bStatus field of the Record. Reading the 435 clears the interrupt.

Enumeration and Error Record (EER)

The EER is used by the USB host system 200 to notify the Main Processor 310 the connect and disconnect of USB devices 320, the enumeration status of devices, and system errors. It has the following format.

EnumErr: [wStatus, bDeviceAddress, idVendor, idProduct, bcdDevice, bConfiguration, Reserved]

The format of the EER in the DCM 220 is as shown in FIG. 9 for one embodiment of this invention. Other information in the device descriptors, such as device class, subclass, number of interfaces and configurations etc., may also be passed to the Main Processor 310. To avoid conflict with the Main Processor 310, a special segment 410 of the DCM 220 is reserved for the USB host system 200 to send EER 900 to the Main Processor 310.

When a device 320 is connected, the USB host system 200 automatically detects it, and sends interrupt to the Main Processor 310. When a device 320 is disconnected, the USB host system 200 also notifies the Main Processor 310 with an interrupt request. Upon receiving the interrupt, the Main Processor 310 reads the EER 900 address from 430 and 435 in the DCM 220. Reading 435 clears the interrupt. The address of EER 900 is in the Last Address range of the DCM 220 which identifies itself to the Application Processor 310 as an EER 900. An EER 900 uses special bit patterns to identify the Record as an enumeration report record or an system error report record.

After reading the EER 900, the Main Processor 310 should write the starting address of the EER 900 to 420 and 425 in the DCM 220 to notify the USB host system 200 that the EER 900 has been read, so that the USB host system 200 may send the next ENR, if there is one.

Summary of the USBDI

The four types of Records described above provide the following services and mechanisms to the Client 150:

Configuration and control of devices via control pipe (using CPR 500)

Transfer services via both control and data pipe mechanisms with all four types of pipes (using CPR 500 and DPR 600)

Event notification (using EER 900)

Status reporting and error recovery (reporting using bStatus and wXferCount, recovery done automatically transparent to the Main Processor 310)

System/Device/Pipe abort/reset/suspend/resume (using SCR 800)

Pipe halt and clear pipe halt (using SCR 800)

Queuing and dispatching I/O request packets (IRPs) (done automatically transparent to Main Processor 310)

The Main Processor 310 has the flexibility in allocating the starting address and size of the buffers for the CPR 500 and DPR 600, and in establishing multiple DPRs 600 to fit the need of the different USB transfers. For example, multiple DPR 600 may be set up for a single isochronous pipe to ensure data rate.

The Main Processor 310 should not use the same area to initiate a different Record before the previous Record is done because the starting address of the Records is used to identify the Records.

Although the foregoing description of the preferred embodiment of the present invention has shown, described, and pointed out the fundamental novel features of the invention, it will be understood that various omissions, substitutions, and changes in the form of the detail of the programs, processes, systems and methods as illustrated, as well as the uses thereof, may be made by those skilled in the art without departing from the spirit of the present invention. Hence, the scope of the present invention should not be limited to the foregoing discussion, but should be defined by the appended claims.

What is claimed is:

1. An embedded computing system, comprising:
   a main processor; and
   a USB host system comprising of a first processor that implements a USB driver and a USB host controller driver for processing USB transfers initiated by an application program running on the main processor, and the first processor presents a high level interface to the application program, wherein the USB host system interfaces with the main processor using a standard microprocessor bus interface and the main processor does not have to run the USB driver and the USB host controller driver; a downstream USB port; and
   a communication area directly accessible by both the main processor and the first processor such that the first processor interfaces with the main processor via the communication area using predefined records in predefined formats, wherein the main processor writes a data transfer request in the communication area in a pre-defined record format, and wherein the first processor schedules and completes the request via a USB host controller.

2. The embedded computing system of claim 1, wherein the communication area is a dual port memory.

3. The embedded computing system in claim 1, wherein the communication area consists of multiple FIFO registers.

4. The embedded computing system in claim 1, wherein an interrupt polled from a USB interrupt pipe is converted to an interrupt signal to the main processor.

5. The embedded computing system in claim 1, wherein a hub is used to provide multiple downstream USB ports.

6. The system of claim 1, wherein data in the communication area is directly sent out on a USB bus.

7. The embedded computing system in claim 1, wherein data received from the USB bus are written directly in the communication area.

8. The embedded computing system of claim 1, wherein the USB host system provides a USB function to the main processor.

9. A USB host system operationally coupled to an embedded computing system, comprising:
   a first processor that implements a USB driver ("USBD") and a USB host controller driver for processing USB transfers initiated by an application program running on a second processor of the embedded computing system; wherein the embedded computing system operates with or without an operating system; with or without USB support and the second processor does not have to run the USBD or the USB host controller driver;
   a downstream USB port; and,
   an interface between the first processor and a second processor that provides a high-level USB pipe view of a USB system to the application program running on the second processor in the embedded computing system,
   wherein the interface comprises a memory that is directly accessed by both the first and second processors, and
   wherein the second processor interfaces with the host system via a standard microprocessor bus.

10. The USB host system of claim 9, wherein a hub is used to provide multiple downstream USB ports.

11. The USB host system of claim 9, wherein the host system is used to provide a USB host function to the second processor.

12. The USB host system of claim 9, wherein the second processor runs an operating system supporting a USBD,
   wherein the USB host system provides a USB host function to the second processor, including a USBD function, and
   wherein the USB host system processes a USB transfer request by the second processor by intercepting calls to the USBD in the operating system and passing the calls to the USBD in the USB host system.

13. A USB host comprising:
   a first processor implementing a function of a USB system including a USB driver and a USB host controller driver;
   a downstream USB port; and,
   a memory connected to both the first processor and a second processor external to the USB host via a standard microprocessor bus interface,
   wherein a first area of the memory with a first predetermined format is used for a first type of transfer, and a second area of the memory with a second predetermined format is used for a second type of transfer,
   wherein an application program running on the second processor initates a transfer, and the second processor does not have to run the USB driver and the USB host controller driver.

14. The USB host of claim 13, wherein a hub is connected to the downstream USB port so that multiple devices can be connected to the system.

15. The USB host of claim 13, wherein a third area of the memory with a third predetermined format is used for reporting device connection, enumeration and removal to the second processor.

16. The USB host of claim 15, wherein the third area is in a part of the memory that is read-only to the second processor.

17. The USB host of claim 13, wherein a fourth area of the memory with a fourth predetermined format is used for sending a USB command to the USB host.

18. The USB host of claim 13, wherein the starting address of each memory area for a transfer is used to identify the transfer.

19. The USB host of claim 13, wherein the second processor allocates the size of a memory area for a transfer to fit the need of the transfer.

20. The USB host of claim 13, wherein the second processor allocates the number of said areas to fit the need of a transfer.

21. The USB host of claim 13, wherein the respective starting addresses of the first and second areas are at different locations in the memory.

22. The USB host of claim 13, wherein the respective starting addresses of the first and second areas are at the same location in the memory.

23. The USB host of claim 13, wherein the predetermined formats of the first and second areas are the same.

24. The USB host of claim 13, wherein the respective starting addresses of the first and second areas are stored at fixed locations in the memory.

25. The USB host of claim 13, wherein the second processor writes a transfer request in one of said areas in the memory and notifies the first processor of the request with an interrupt signal.

26. The USB host of claim 13, wherein the first processor writes the status or data of a transfer into one of said areas in the memory and notifies the second processor of the request with an interrupt signal.

27. The USB host of claim 13, wherein a single format of the second area implements isochronous, interrupt and bulk transfers.

28. A USB host comprising:
a first processor implementing a function of a USB system including a USB driver and a USB host controller driver;
a downstream USB port; and,
a memory directly accessible by both the first processor and a second processor external to the USB host via a standard microprocessor bus interface, wherein the second processor does not have to run the USB driver and the USB host controller driver,
wherein an application program running on the second processor initiates a USB transfer by writing a transfer request and any data to be transferred into a first area in the memory, and
wherein the first processor carries out the transfer request and writes the status of the transfer and any transferred data into a second area in the memory.

29. The USB host of claim 28, wherein a hub is connected to the downstream USB port so that multiple devices can be connected to the system.

30. The USB host of claim 28, wherein the first and second areas in the memory are the same area.

31. The USB host of claim 28, wherein the first and second areas in the memory use the same predefined format.

32. The USB host of claim 28, wherein the second processor runs an operating system that supports a USB driver, and wherein a USB transfer request initiated by the second processor to the USB driver is carried out by the USB host.

33. The USB host of claim 28, wherein the USB host transmits an interrupt signal to the second processor to notify the second processor that the transfer has been completed.

34. The USB host of claim 28, wherein the second processor transmits an interrupt signal to the USB host to notify the USB host that the second processor has initiated a USB transfer.

35. A USB host system integrated with an embedded computing system with a main processor, comprising:
a processor that interfaces with the main processor via a communication area using predefined records in pre-defined formats and implements a USB driver and a USB host controller driver,
wherein an application program running on the main processor writes a data transfer request in the communication area in a pre-defined record format and the processor schedules and completes the request via a USB host controller, and
wherein the main processor and the processor are operationally coupled via a standard microprocessor bus interface and the main processor does not have to run the USB driver and the USB host controller driver.

36. The USB host system of claim 35, wherein the processor returns status and data to the main processor based on a request from the main processor.

37. The USB host system of claim 35, wherein the communication area is a dual port memory with plural registers.

38. The USB host system of claim 35, wherein the main processor may poll the communication area and/or be notified by an interrupt generated by the processor.

39. The USB system of claim 35, wherein the communication area is divided into a first area with a predefined format for a first type of transfer, and a second area with a second predefined format for a second type of transfer.

40. The USB host system of claim 35, wherein the communication area includes a third area with a third pre-defined format to report device connection and/or removal from the main processor.

41. The USB host system of claim 35, wherein the communication area includes a fourth area for storing a USB command in a fourth pre-defined format for sending a USB command to the processor.

42. The USB host system of claim 35, wherein the starting address of the communication areas are used to identify a transfer.

43. The USB host system of claim 35, wherein the main processor may allocate the dual port memory areas for a transfer.

44. The USB host system of claim 37, wherein the dual port memory may implement isochronous, interrupt and/or bulk transfers.

* * * * *